United States Patent [19]

Hogen-Esch

[11] Patent Number: 4,746,544
[45] Date of Patent: May 24, 1988

[54] PROCESS FOR APPLYING A SEALANT COMPOSITION

[75] Inventor: Thieo E. Hogen-Esch, Gainesville, Fla.

[73] Assignee: Renbec International Corp., Brooksville, Fla.

[21] Appl. No.: 195

[22] Filed: Jan. 2, 1987

[51] Int. Cl.$^4$ .............................................. B32B 35/00
[52] U.S. Cl. .................................... 427/140; 427/142; 427/197; 427/202; 427/385.5
[58] Field of Search ............... 427/140, 197, 142, 202, 427/340, 388.1, 393.5, 201, 385.5

[56] References Cited

U.S. PATENT DOCUMENTS 4,215,173 7/1980 Hubbard ........................ 427/208.8
4,405,750 9/1983 Nakata et al. ................... 524/775
4,659,589 4/1987 Jimenez .......................... 427/140

Primary Examiner—Sadie L. Childs
Attorney, Agent, or Firm—Walter J. Monacelli

[57] ABSTRACT

In repairing a rupture or opening as described herein the rupture or opening and the adjacent area of the surface in which the rupture or opening occurs is covered by a layer of an alpha-cyanoacrylate which is liquid at 20° C. and has the formula $CH_2=C(CN)-COOR$ wherein R is a hydrocarbon radical selected from the group consisting of aliphatic, aromatic and cycloaliphatic hydrocarbon groups of 1-10 carbon atoms and alkoxy, chloro and fluoro derivatives of said hydrocarbon groups in which alkoxy groups there are 1-4 carbon atoms therein; and spreading on the said layer of alpha-cyanoacrylate a layer of a powder comprising rubber.

27 Claims, 1 Drawing Sheet

PROCESS FOR APPLYING A SEALANT COMPOSITION

FIELD OF THE INVENTION

This invention relates to a new sealant composition. More specifically it relates to a sealant composition which can be easily applied to seal punctures and ruptures in various materials and is cured in a short time to make a very effective seal having very good flexibility. Still more specifically, this invention relates to the application of a cyanoacrylate to the puncture or rupture and shortly thereafter applying a material, preferably powdered rubber, either newly vulcanized or reclaimed rubber.

DESCRIPTION OF THE PRIOR ART

Anyone who has had an automobile radiator or heater hose rupture when some distance from a service station or when service stations are closed can appreciate the need and desirability of a sealant that can be easily and quickly applied to repair the rupture. Moreover there are any number of other types of ruptures, holes, cracks, etc., in various other articles that show a need for such a sealant.

Various compositions advertised as sealants for such purposes have proved very unsatisfactory. Even such products as the fast setting super glues, while very competent for adhering and gluing pieces together have not been found suitable as a sealant to repair ruptures, breaks and other types of openings in hoses, pipes, etc. Since the addition of activators and other materials which might have fast crosslinking and other hardening effects when incorporated within the cyanoacrylate would only serve to effect premature setting, this makes such additions highly impractical.

U.S. Pat. No. 3,836,377 describes the method of priming surfaces of pieces to improve adhesion by means of alpha-cyanoacrylate with compounds containing a

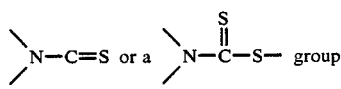

These dithiocarbamates, sulfenamides, etc., may also be incorporated directly into the cyanoacrylate to improve the cure. This latter fact shows these particular compounds cannot be as active as the accelerator or initiator of the present invention.

U.S. Pat. No. 4,180,913 describes a dental material comprising an alpha-cyanoacrylate containing as filler a silica powder coated with a solid having a weak catalytic activity for the alpha-cyanoacrylate. After the composition is applied to the tooth, a "setter" composition comprising a basic amine compound having a strong catalytic activity to the alpha-cyanoacrylate is applied to cure the dental material. The curing promoters or "setters" are tertiary amines such as N,N-dimethyl-p-toluidine, N,N-dimethylaniline, etc.

Patent application Ser. No. 747,326 filed by Rene C. Jimenez on June 21, 1985 issued as U.S. Pat. No. 4,659,589 on Apr. 21, 1987 for a SEALANT COMPOSITION which comprises a process and composition involving the use of a powdered solid having hydroxyl, carboxylate or both hydroxyl and carboxylate groups therein to serve as an initiator or activator of a layer of an alkyl alpha-cyanoacrylate imposed over and around a rupture or an opening to be sealed. While the resultant seal is very effective and gives a very rapid seal for most purposes, it is desired to give more flexibility to the seal particularly where the seal is made on a flexible material, such as rubber hoses, etc.

SUMMARY OF THE INVENTION

In accordance with the present invention it has been found that a two component sealant for repairing ruptures, breaks, tears and other openings in various devices comprises a first component of an alpha-cyanoacrylate in which the acrylate ester group has 1–10 carbon atoms, and as a second component an initiator or activator comprising a powdered rubber, either a freshly vulcanized material or a reclaimed rubber. In applying the sealant to the rupture, etc., the cyanoacrylate is applied to the rupture, etc., and to an area around the rupture, preferably after the surrounding surface has been cleaned and dried by wiping or by other suitable means. It is desirable to twist the material where possible to allow parting of the ruptured surfaces so that the cyanoacrylate may flow into the rupture and wet the surfaces thereof. After the cyanoacrylate has been allowed to set for a very short period, sufficient of the solid powdered activator is applied over the surface of the cyanoacrylate, sufficient being used to cover the area above the rupture and the surrounding area.

The rubber materials include but are not limited to cis-1,4-polybutadiene, 1,2-polybutadiene, cis-1,4-polyisoprene, poly(chloroprene), butadiene-acrylonitrile copolymers, styrene-butadiene copolymers (both random and block copolymers), poly-(n-butylmethacrylate), terpolymers of butadiene, acrylonitrile and acrylic acid, etc. Powdered reclaimed rubber from used rubber products including tires is also suitable.

A particularly suitable material is a granular or ground reclaimed rubber from truck and bus tire tread, free of fabric and foreign material. This material has an approximate analysis of:

| | |
|---|---|
| Acetone extractable | 13–17% |
| Ash Content | 5–7% |
| Carbon Black Content | 29–33% |
| Moisture Content | About 0.75% |
| Natural Rubber Content | 20–30% |
| Rubber Hydrocarbon | 29–45% |
| Typical bulk density | 210 cc./100 g. |

Such a reclaimed powdered rubber material is available from Baker Rubber, Inc. of South Bend, Ind. Three grades of varying paticle size are:

TP-20
All passes through 16 mesh (USA Sieve)
3% Retained on 20 mesh
25% Retained on 30 mesh
72% Passes through 30 mesh
TP-30
All passes through 20 mesh (USA Sieve)
5% Retained on 30 mesh
25% Retained on 40 mesh
70% Passes through 40 mesh
TP-40
All passes through 20 mesh (U.S.A. Sieve)
0.1% Retained on 30 mesh
10% Retained on 40 mesh
25% Retained on 50 mesh
64.9% Passes through 50 mesh While applicant does not wish to rely upon any particular mechanism or explanation of what reaction occurs during the hardening or sealing operation, it is believed that the activator or initiator promotes a chain reaction at the surface of the cyanoacrylate layer and the chain reaction proceeds downward through the thickness of the cyanoacrylate and effects hardening, possibly by further propagation of polymer molecules in the cyanoacrylate. In any case, the cyanoacrylate is hardened to effect the sealant function.

The accompanying drawings illustrate the manner in which the sealing power of the sealant of this invention can be tested.

Figure 1:
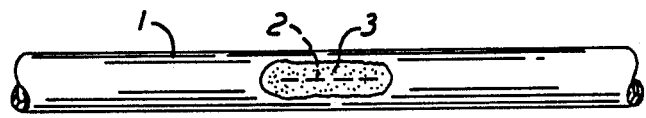
FIG. 1 shows a side elevational view of a section of hose or tubing which has a single slit parallel to the axis of the hose.

The initiators which are useful in the practice of this invention to effect curing through the layer of cyanoacrylate by external application to the surface of the cyanoacrylate include a wide variety of rubber materials. Excess rubber material may subsequently be brushed away after the curing or hardening is completed. This rubber material may be diluted with an inert material, such as, an inactive powder, provided the concentration of active material is sufficient to provide the desired curing activity.

The alpha-cyanoacrylates useful in the practice of this invention are preferably liquid monomers having the formula $H_2C=C(CN)-COOR$ wherein R is an aliphatic, aromatic (preferably benzoid aromatic) or cycloaliphatic hydrocarbon, having from 1 to 10 carbon atoms, preferably alkyl, for example, methyl, ethyl, propyl, isopropyl, butyl, isobutyl, amyl, pentyl, hexyl, heptyl, ethylhexyl, octyl, nonyl and decyl. From among these, it is particularly advantageous to employ those wherein R is alkyl having from 1 to 6 carbon atoms, either straight or branched chain. The aromatic and cycloaliphatic groups may have substituent groups, such as an alkyl having from 1 to 10 carbon atoms. The substituents are unlimited as long as the monomers are liquid. Illustrative substituents are lower alkoxy having from 1 to 4 carbon atoms [ethoxyethyl-alphacyanoacrylate] and halo, e.g., chloro and fluoro [trifluoro-isopropylalpha-cyanoacrylate]. In the trifluoro-isopropyl group the three fluorine atoms are preferably bonded to the same carbon atom. In addition, R can also be, for example, cyclohexyl, methylcyclohexyl, phenyl, tolyl, chlorophenyl, propargyl, butynyl, butenyl or allyl. The sole restrictions on R are that the monomer must be liquid at room temperature (20° C.) and atmospheric pressure and a carbon atom of R must be directly bound to the $H_2C=C(CN)-COO$-group.

These alpha-cyanoacrylate monomers can contain any of the other compounding ingredients which are normally employed, such as, viscosity modifiers, coloring agents, fillers, pigments and the like.

Polymerization inhibitors such as sulfur dioxide may also be present. In lieu of sulfur dioxide other acidic inhibitors (against anionic polymerization), such as nitric oxide, nitrous oxide, carbon dioxide, p-toluene sulfonic acid, hydrogen fluoride, trichloroacetic acid and acetic anhydride, can be used to stabilize the monomer. Carbon dioxide is recommended only for monomers wherein R has at least four carbon atoms. In combination with the acidic inhibitor a free radical inhibitor, such as hydroquinone, monomethylether of hydroquinone, picric acid and t-butyl-catechol, pyrocatechol, p-methyoxyphenyl and the like, may be concurrently employed. The monomethylether of hydroquinone is the preferred stabilizer against free radical polymerization. Moreover, it imparts good color stability to both the monomeric alpha-cyanoacrylate and the polymerized product therefrom. Free radical inhibition may be obtained with 10 parts of the monomethylether of hydroquinone per million parts of 1-cyanoacrylic acid ester; in practice from 15 to 200 parts per million are employed.

The free radical polymerization inhibitor, like the anionic polymerization inhibitor, is normally added during the processing of the alpha-cyanoacrylate ester. Hence, a free radical polymerization inhibitor is generally introduced into the distillation vessel and the receiver to stabilize the ester in the synthesis thereof. As a result, commericially available alpha-cyanoacrylate esters may already contain a certain amount of a conventional free radical polymerization inhibitor such as those mentioned hereinabove.

There may also be present in the adhesive compositions of this invention various other optional ingredients including, for example, plasticizers and thickeners. Plasticizers improve the aging characteristics of the cured bonds by lessening the brittleness thereof. For the best performance the amount of plasticizer to be used should not exceed 20% by weight of the total composition. Suitable plasticizers include monofunctional and difunctional aliphatic esters of acids having 1 to 10 carbon atoms, such as, for example, dimethyl octyl sebacate and esters of malonic acid, difunctional aromatic esters, phosphates and phosphonates. Thickeners, which may be used in amounts of up to 25% by weight, depending in part on their degree of fluidity at room temperature, serve to increase the viscosity of the adhesives so that they may be more easily applied. Among the suitable thickeners for this purpose are included, for example, polymeric alkyl alpha-cyanoacrylates, cellulose esters including cellulose acetate butyrate, acrylate resins such as poly(methyl methacrylate) and poly(ethyl methacrylate), and poly(vinyl alkyl ethers) such as poly(vinyl methyl ether).

While as indicated above the flexibility of the cyanoacrylate cured layer is improved by using the rubber as the activator or initiator as described above, it has also been found that the rate of cure and toughness of the cured product are improved by using, with the rubber, one or more of the initiators or activators described by the aforementioned application Ser. No. 747,326 filed by Rene C. Jimenez on June 21, 1985 issued as U.S. Pat. No. 4,659,589 on Apr. 21, 1987, namely a powdered solid having hydroxyl, carboxylate, or both hydroxyl and carboxylate groups therein. Typical of such powdered activators are mono and polysaccharides such as alginate, starch, pectin, carrageenan, locust bean gum, guar gum, cellulose, gum arabic, xanthate gum, sodium bicarbonate, polyvinylalchol, a vinylalcohol-vinylacetate copolymer having at least 25% vinylalcohol groups therein, a sodium salt of polyacrylic acid, a sodium salt of polymethacrylic acid, an ammonium salt of polyacrylic acid and an ammonium salt of polymethacrylic acid. Therefore there may be 0–95% of the other powdered activator mixed with the powdered rubber, advantageously 5–95%, or preferably 25–75% based on the combined weight of the powdered rubber and the other activator.

SPECIFIC EMBODIMENT OF THE INVENTION

In order to perform various tests on the efficiency of the sealant composition of this invention, the equipment shown in the drawings is used.

FIG. 1 shows a section of garden hose. Hose 1 has a slit 2 having a slit length of 1 inch running parallel to the axis of the hose. This slit is covered with a layer of alpha-cyanoacrylate 3 (commercial type Super Glue as marketed by Super Glue Corp.) with the layer of glue extending over an area of the tube adjacent to the slit.

Figure 2:
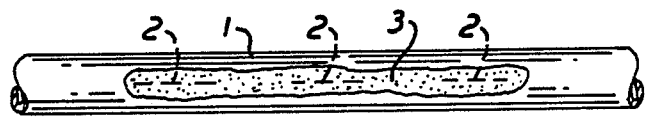
FIG. 2 shows a side elevational view of another section of hose or tubing with three slits parallel to the axis of the hose.

FIG. 2 shows a section of Neoprene rubber hose having three such slits 1 with a spacing of 1 inch between adjacent slits in the tube with a layer of alpha-cyanoacrylate 3 covering the three slits and adjacent area.

Figure 3:
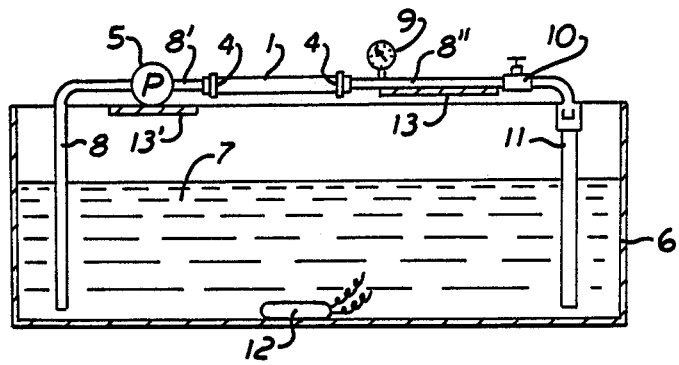
FIG. 3 is a schematic view of equipment for controlling the pressure and temperature for sealant testing.

FIG. 3 shows equipment for testing such tubing on which the layer has been cured by covering the alpha-cyanoacrylate layer with the powdered initiator (not shown) to effect curing and hardening of the cyanoacrylate to function as a sealant. Tank 6 is more than half filled with water 7. Pump 5 positioned between pipe or tubing 8 and pipe or tubing 8' is supported by plate 13'. Hose 1 is fastened by clamps 4 to join pipe 8' with pipe 8" which latter pipe is supported on plate 13. Plates 13 and 13' rest on supporting means which are not shown. Valve 10 is positioned on pipe 8" to control the flow of water therethrough. Catch pipe 11 catches water flowing out of pipe 8" and returns it to tank 6. Heater 12 is used to heat the water to desired temperatures so that the repaired hose can be operated under temperature and pressure conditions that the hose may be exposed to in actual use.

The invention is illustrated by the following examples which are intended merely for purpose of illustration and are not to be regarded as limiting the scope of the invention or the manner in which it may be practiced. Unless specifically indicated otherwise, parts and percentages are given by weight.

EXAMPLE I

A number of strips of alkyl alpha-cyanoacrylate (Super Glue) are laid out on a sheet of aluminum foil and a different powdered activator is applied to the surface of cyanoacrylate. The time of curing is noted in each case and after curing the strips are peeled off of the aluminum foil and compared for flexibility. The various activators, the time of cure and relative flexibility are reported in the following table.

TABLE I

| Exp. No. | Powdered Rubber | Curing Time (Min) | Flexibility |
|---|---|---|---|
| A. | Cis-1,4-Polyisoprene | 1-5 | Most |
| B. | (Vulcanized & stabilized) Butadiene-Acrylonitrile Copolymer (Hycar 1422) | 1-5 | Medium |
| B'. | Hycar 1411 | 1-5 | Medium |
| C. | Styrene-Butadiene Block Copolymer (Stabilized-Sol T-161) | 3-10 | Most |
| D. | Poly(chloroprene) "Neoprene WHV-A" | 3-10 | Medium |
| E. | Cis-1,4-polybutadiene (No additives) | 10-30 | Medium |
| F. | 1,2-Polybutadiene (No additives Laboratory prepared) | 10-30 | Medium |
| G. | Cis-1,4-polyisoprene (No additives) | 10-30 | Medium |
| H. | Poly(chloroprene) (No additives) | 3-10 | Medium |
| I. | Poly-n-butyl-methacrylate (No additives) | 3-10 | Medium |
| Control | Alginate | 1-5 | Poor |

Particle size of the powdered rubber affects the flexibility, with fine particles giving better flexibility and large particles giving less flexibility. In all cases the flexibility with the various rubber was improved over cyanoacrylate activated by polysaccharides such as alginate alone. However, the curing time and toughness are improved by incorporating 5, 25 and 50% by weight of a polysaccharide, such as alginate, guar gum, etc. with the powdered rubber. The addition of the polysaccharide does not appear to adversely affect strip flexibility.

EXAMPLE II

In a Neoprene fuel line hose having an inside diameter of ⅜ inch, three slits each one inch long and one inch apart as shown in FIG. 2 are cut into the hose as shown in FIG. 2. These slits together with the adjacent area extending about at least ¼ inch in all directions around the slits, are covered with a layer of alpha-cyanoacrylate (Super Glue). The hose is twisted to open the slits so as to allow the cyanoacrylate to wet the sides of the slits. Shortly thereafter the powdered rubber activator is applied to cover completely the layer of Super Glue. Then after about 10 minutes of curing, tests are performed with the equipment shown in FIG. 3. In order to raise the hose to the desired temperature the water in the tank 6 is heated to the desired temperature (about 22° C.) and pumped through hose 1 until well heated. Then valve 10 is partially closed to maintain the desired pressure. When a leak deveops in one of the slits, it is repaired with a layer of cyanoacrylate covered with a layer of powdered alginate to give a faster cure and then the test is continued to test the remaining repaired slits. The specific curing agent, the pressure applied, the water temperature and duration of tests are reported below in Table II.

TABLE II

| Exp No. | Percent in Powder | | | Number of Tubes With 3 Slits Each | Pressure Applied After Powder Cured (psi) | No. of failures Per Total No. of Slits | How Many Minutes Pressure Held Before | |
|---|---|---|---|---|---|---|---|---|
| | White Rubber | Black Rubber | Guar Gum | | | | Leak | Release |
| Control | — | — | — | 1 | 80 | ⅓ | 1 | |
| A | — | 100 | — | 1 | 80 | ⅓ | 1 | 10*−3 |
| A' | — | 100 | — | 1 | 80 | ⅓ | 8 | |
| B | 100 | — | — | 1 | 50 | 0 | — | 15 |
| | | | | | 80 | ⅓ | 5 | — |
| C | — | 50 | 50 | 1 | 50 | 0 | = | 5 |

TABLE II-continued

| Exp No. | Percent in Powder White Rubber | Percent in Powder Black Rubber | Percent in Powder Guar Gum | Number of Tubes With 3 Slits Each | Pressure Applied After Powder Cured (psi) | No. of failures Per Total No. of Slits | How Many Minutes Pressure Held Before Leak | How Many Minutes Pressure Held Before Release |
|---|---|---|---|---|---|---|---|---|
| | | | | | 80 | 0 | — | 15 |
| | | | | | 100 | 0 | — | 5*−2 |
| D | 50 | — | 50 | 1 | 50 | 0 | — | 15 |
| | | | | | 80 | 0 | — | 5 |
| D' | 50 | — | 50 | 1 | 50 | 0 | — | 15 |
| | | | | | 80 | 1 | 5 | — |
| E | 25 | 50 | 25 | 1 | 80 | 1 | 5 | |
| E' | 25 | 50 | 25 | 1 | 80 | 0 | — | 15 |
| F*−4 | 33.3 | 33.3 | 33.3 | 1 | 50 | 0 | — | 15 |
| | | | | | 80 | 0 | — | 5 |
| G | — | 75 | 25 | 1 | 80 | 0 | — | 15 |
| G' | — | 75 | 25 | 1 | 80 | 0 | — | 15 |

*−1 Polyisoprene rubber cut in small pieces (gives coarse powder) for polyisoprene rubber stopper
*−2 At 4.5 minutes the tube separated at 100 psi but not at repaired ruptures.
*−3 After initial leak repaired, pressure applied and held for 10 minutes at 80 psi before tube separated but not at repaired slits.
*−4 Test repeated three times with same results
*−5 White rubber is powdered Hycar 1422 produced by Goodrich.

EXAMPLE III

The procedure of Example II is repeated a number of times using the following combinations of powders individually to coat the cyanoacrylate:
(a) 50% TP-20 and 50% Alginate
(b) 50% TP-30 and 50% Alginate
(c) 50% TP-40 and 50% Alginate
(d) 75% TP-20 and 25% Guar Gum
(e) 75% TP-30 and 25% Guar Gum
(f) 75% TP-40 and 25% Guar Gum
(g) 50% TP-20 and 50% Starch
(h) 50% TP-30 and 50% Pectin
(i) 50% TP-40 and 50% Gum Arabic In each case there is no failure on any of the seals upon exposure to 50 psi for 15 minutes and 80 psi for 5 minutes.

EXAMPLE IV

The procedure of Example II is repeeteed using "Tygon" tubing having an inside diameter of ⅜ inch (Tygon is the registered trademark of Goodrich Chemical Company for its polyvinylchloride tubing).

| Curing Agent | Applied Pressure | Water Temp. °C. | Failure Time (Min.) |
|---|---|---|---|
| 50% TP-20 50% Guar-Gum | 50 psi | 22 | 15 |

EXAMPLE V

A chromium plated copper tube having an inside diameter of ⅜ inch has a 3/22 inch hole drilled therein. This hole is covered with Super Glue and then with the activator combination of Example IV as described above following which testing in the equipment of FIG. 3 shows that the sealant withstands a pressure of 50 psi at 22° C. for 15 minutes.

EXAMPLE VI

The procedure of Example II is repeated a number of times with similar successful results using the activator combination of Example IV and as the alpha-cyanoacrylate the following respectively:
(a) A 50—50 mixture of methyl and ethyl alpha-cyanoacrylate;
(b) Butyl alpha-cyanoacrylate;
(c) Hexyl alpha-cyanoacrylate;
(d) Phenyl alpha-cyanoacrylate; and
(e) Cyclohexyl alpha-cyanoacrylate.

The sealant of this invention can be used to seal openings or ruptures in any type of material. The only requirement is that the alpha-cyanoacrylate adheres effectively to the material.

The initiator material may be used in various mixtures with each other or with inert materials provided there is at least 25%, preferably at least 50% of the active ingredient or ingredients. The balance can be of various inert fillers or less active materials such as finely divided silica, graphite, etc.

While certain features, of this invention have been described in detail with respect to various embodiments thereof, it will of course be apparent that other modifications can be made within the spirit and scope of this invention and it is not intended to limit the invention to the exact details shown above except insofar as they are defined in the following claims.

The invention claimed is:

1. A process for applying a sealant comprising the steps of:
    (a) applying a layer of an alpha-cyanoacrylate over the rupture or opening to be sealed and over the area adjacent to said rupture or opening, said alpha-cyanoacrylate being liquid at 20° C. and having the formula $CH_2=C(CN)-COOR$ wherein R is a hydrocarbon radical selected from the group consisting of aliphatic, aromatic and cycloaliphatic hydrocarbon groups of 1–10 carbon atoms and alkoxy, chloro and fluoro derivatives of said hydrocarbon groups in which alkoxy groups there are 1–4 carbon atoms therein; and
    (b) spreading on the said layer of alpha-cyanoacrylate a layer of a powder comprising rubber.

2. The process of claim 1 in which said R group is an alkyl group of 1–6 carbon atoms.

3. The process of claim 2 in which said powdered rubber is selected from the group consisting of natural rubber, cis-1,4-polybutadiene, 1,2-polybutadiene, cis-1,4-polyisoprene, poly(chloroprene), butadieneacrylonitrile copolymer, random and block copolymers of styrene and butadiene, poly-(n-butyl-methacrylate) and terpolymers of butadiene, acrylonitrile and acrylic acid.

4. The process of claim 2 in which said powdered rubber is a reclaimed rubber.

5. The process of claim 2 in which said powdered rubber is natural rubber.

6. The process of claim 2 in which said powdered rubber is cis-1,4-polybutadiene.

7. The process of claim 2 in which said powdered rubber is 1,2-polybutadiene.

8. The process of claim 2 in which said powdered rubber is cis-1,4-polyisoprene.

9. The process of claim 2 in which said powdered rubber is poly(chloroprene).

10. The process of claim 2 in which said powdered rubber is butadiene-acrylonitrile copolymer.

11. The process of claim 2 in which said powdered rubber is selected from the group consisting of random and block copolymers of styrene and butadiene.

12. The process of claim 2 in which said powdered rubber is poly-(n-butylmethacrylate).

13. The process of claim 2 in which said powdered rubber is a terpolymer of butadiene, acrylonitrile and acrylic acid.

14. The process of claim 2 in which said powdered rubber contains mixed intimately therein 0–95 percent by weight of a powdered solid having hydroxyl, carboxylate or both hydroxyl and carboxylate groups therein.

15. The process of claim 2 in which said powdered rubber comprises an intimate mixture of 25–75 percent by weight of said powdered rubber and 25–75 percent by weight of a powdered solid having hydroxyl, carboxylate or both hydroxyl and carboxylate groups therein.

16. The process of claim 15 in which said powdered solid is selected from the group consisting of monosaccharides and polysaccharides.

17. The process of claim 15 in which said powdered solid is selected from the group consisting of alginate, starch, pectin, carrageenan, locust bean gum, guar gum, cellulose, gum arabic, xanthate gum, sodium bicarbonate, polyvinyl alcohol, vinylalcohol-vinylacetate copolymer having at least 25 percent by weight of vinylalcohol groups therein, sodium salt of polyacrylic acid, sodium salt of polymethacrylic acid, ammonium salt of polyacrylic acid and ammonium salt of polymethacrylic acid.

18. The process of claim 15 in which said powdered solid is alginate.

19. The process of claim 15 in which said powdered solid is guar gum.

20. The process of claim 15 in which said powdered solid is starch.

21. The process of claim 15 in which said powdered solid is pectin.

22. The process of claim 15 in which said powdered solid is gum arabic.

23. The process of claim 17 in which said alpha-cyanoacrylate is the methyl ester.

24. The process of claim 17 in which said alpha-cyanoacrylate is the ethyl ester.

25. The process of claim 17 in which said alpha-cyanoacrylate is a mixture of the methyl and ethyl esters.

26. The process of claim 17 in which said alpha-cyanoacrylate is a butyl ester.

27. The process of claim 17 in which said alpha-cyanoacrylate is a propyl ester.

* * * * *